(12) United States Patent
Briggs et al.

(10) Patent No.: US 10,580,077 B1
(45) Date of Patent: Mar. 3, 2020

(54) SYSTEM AND METHOD FOR PROVIDING A LIFESPAN EXPECTATION TO AN INSURANCE APPLICANT

(71) Applicant: Longevity Quest, Inc., Birmingham, AL (US)

(72) Inventors: Robert Stephen Briggs, Birmingham, AL (US); Larry Joel Adams, Birmingham, AL (US)

(73) Assignee: Longevity Quest, Inc., Birmingham, AL (US)

( * ) Notice: Subject to any disclaimer, the term of this patent is extended or adjusted under 35 U.S.C. 154(b) by 938 days.

(21) Appl. No.: 14/636,102

(22) Filed: Mar. 2, 2015

(51) Int. Cl.
*G06Q 40/08* (2012.01)
(52) U.S. Cl.
CPC .................. *G06Q 40/08* (2013.01)
(58) Field of Classification Search
USPC ............................................. 705/4
See application file for complete search history.

(56) References Cited

U.S. PATENT DOCUMENTS

| | | | |
|---|---|---|---|
| 8,498,879 B2* | 7/2013 | Michon | G06Q 50/22 705/2 |
| 9,944,978 B2* | 4/2018 | Harley | C12Q 1/6851 |
| 2004/0122705 A1* | 6/2004 | Sabol | G06F 19/324 705/2 |
| 2006/0025931 A1* | 2/2006 | Rosen | G06F 19/00 702/19 |
| 2009/0299767 A1* | 12/2009 | Michon | G06Q 50/22 705/3 |

OTHER PUBLICATIONS

"Life Expectancy Test: How Urine May Help Determined How Long You Live" Huff Post. Mar. 22, 2013 (Year: 2013).*

* cited by examiner

*Primary Examiner* — Bruce I Ebersman
(74) *Attorney, Agent, or Firm* — The Gache Law Firm, P.C.; Russell C. Gache

(57) ABSTRACT

A system is presented by which a consumer such as an insurance applicant may procure a testing process in a comparative manner to facilitate comprehension of their health state relative to others in their community. Physical heath measurements and blood and urine samples are taken from an applicant through, for example, a visit by a phlebotomist or other medical practitioner. Physical readings are then sent to a third party laboratory that produces a risk assessment score for the applicant and notes other data potentially affecting lifespan longevity of the applicant. That information is then transmitted to a life expectancy processor to calculate various life expectancy values and establish a comparative life expectancy ranking for the applicant. A life expectancy ranking is then produced relative to others in the applicant's community, and that ranking is displayed in a graphical format to facilitate understanding by the applicant as to their relative health.

15 Claims, 8 Drawing Sheets

SYSTEM AND METHOD FOR PROVIDING A LIFESPAN EXPECTATION TO AN INSURANCE APPLICANT

FIELD OF THE INVENTION

The present invention relates generally to prediction methods for human lifespans. The invention also relates generally to methods for informing an insurance applicant as to their life expectancy based on various factors. In greater particularity, the invention relates to an informative ranking method for human lifespans for insurance applicants or other interested consumers.

BACKGROUND OF THE INVENTION

Consumer sentiment toward wellness and overall health has changed significantly over the last two decades. According to the Department of Labor, chronic diseases such as diabetes, heart disease, and pulmonary conditions are on the increase, driving up the cost of health care in Americans. The problem is not isolated to a single generation, with younger generations also susceptible to such diseases. Fortunately, consumer health awareness in popular culture has increased, resulting in several service sectors catering to a healthier lifestyle. For example, restaurants now offer healthier menu choices; grocery stores carry organic and locally sourced alternatives; and shopping services and meal planning organizations have incorporated healthy lifestyle programming.

Following this trend is the healthcare industry. Concierge type doctors have moved from a purely reactive treatment model to a model that includes preventive care, and fitness clubs and boutique workout classes have become so popular that a social competition as to one's fitness characterizes some communities. Entirely new industries are being created, such as wearable biometric tracking devices, and more and more services are offering consumers the ability to order their own diagnostic tests without the need for personal physician involvement.

From an employer perspective, chronic diseases are increasing work absenteeism and reduced job performance, and employer-sponsored wellness programs are gaining popularity as a means to motivate employees to improve their health and, thereby, their economic value. Approximately half of U.S. employers now offer wellness programs, including screening and health interventions. This increased emphasis on wellness, whether from employer-sponsored programs and incentives or from individual motivations for a healthier lifestyle, consumers have become more actively engaged in their health. People are more willing to invest in their wellness than ever before.

However, indications are that these efforts are falling short of expectations. Roughly two out of three U.S. adults are overweight or obese, and the prevalence of obesity in younger Americans is on the rise. Healthcare costs continue to grow at alarming rates, and employers are not seeing the cost savings or productivity gains they had hoped from wellness initiatives.

It remains to be seen if wearable biometric tracking devices will result in sustained engagement by their users.

Interestingly, health insurance companies may know more about the health of their insured customers than the customers themselves. Prior to accepting applicants in an insurance pool, such as with life insurance applicants, many types of insurance carriers require medical exams to collect physical readings and take fluid samples. They then use that information to establish a risk category or class for each applicant. In fact, insurance carriers usually contract with third party labs to analyze the collected physical data and fluid samples and provide a detailed report to the carrier on the applicant. For example, Quest Diagnostics, Inc. has a division called ExamOne that provides lab testing-based health assessments for common conditions such as diabetes and heart disease to insurance carriers, and they provide a testing results interface that may be accessed by an insurance applicant that has undergone testing over the internet. However, third party testing organizations such as ExamOne do not provide to their carrier customers or to the insurance applicants a way to understand those testing results within a community context, nor provide any perspective on how a testing applicant should interpret those testing results. An applicant might be able to find a physician that has access to standard norms in a community to advise an applicant as to their standing as compared to others, but rarely does an applicant provide access to a physician to review their testing results unless the physician was the original requestor. Hence, third party testing companies remain in a hidden background of applicant services to assist insurance providers with risk assessment services during the insurance application process while leaving the applicant out of the information loop.

Hence, the question remains what type of systems and services would result in sustained health awareness by the populace, and how should such services be presented? What is needed is a system to allow users to understand their health position relative to the community in which they live as well as foster a competitive attitude toward good health, and identify situations in which a person's health that can be immediately addressed with preventative care response when needed. Such a system would be more effectively adopted if incorporated into or affiliated with an insurance application process, such as when an applicant applies for life insurance.

SUMMARY OF THE INVENTION

The invention consists of a method and system to utilize risk factor laboratory information to calculate a consumer's probable lifespan and provide comparative feedback to that consumer as to how that predicted lifespan compares to others in their community. A consumer, such as a life insurance applicant, undergoes a simple paramedical exam to provide blood, urine, and physical measurements. The blood and urine are sent to a laboratory along with physical measurements that provides electronically a feedback file to a lifespan processing system. The provided file includes various health information about the applicant, and a risk score. The risk score is then associated with a scalar value in a linked table and that scalar is then used to calculate the applicant's expected lifespan as a percentile rank of that applicant relative to others in their community. Various graphs are provided showing the applicant's life expectancy relative to other community life expectancies and as percentile ranking in the community.

Other features and objects and advantages of the present invention will become apparent from a reading of the following description as well as a study of the appended drawings.

BRIEF DESCRIPTION OF THE DRAWINGS

A system incorporating the features of the invention is depicted in the attached drawings which form a portion of the disclosure and wherein:

FIG. 3 is a life expectancy VBT table for a male, non-smoker;

FIG. 4 is portion of a risk table segregated by age and sex;

DESCRIPTION OF THE PREFERRED EMBODIMENTS

Figure 1:
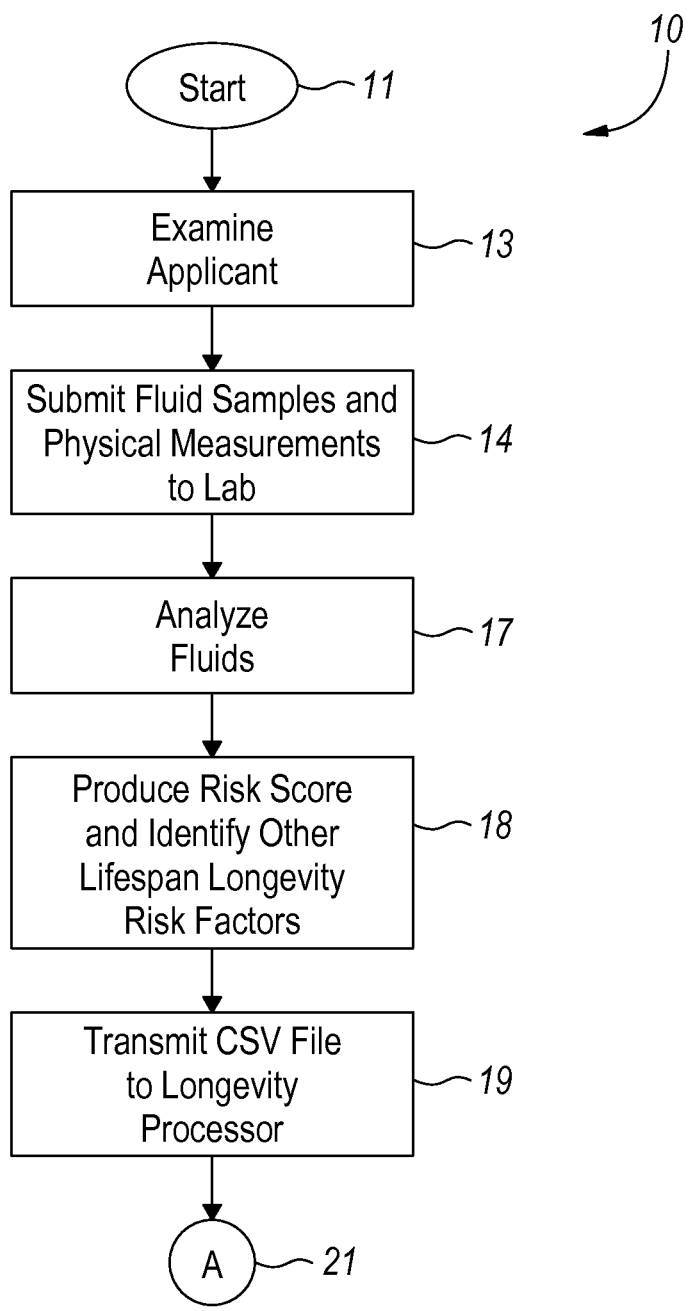
FIG. 1 is a flow diagram of the front-end collection and analysis steps of blood and urine samples, with physical measurement data taken from an applicant.
Figure 2:
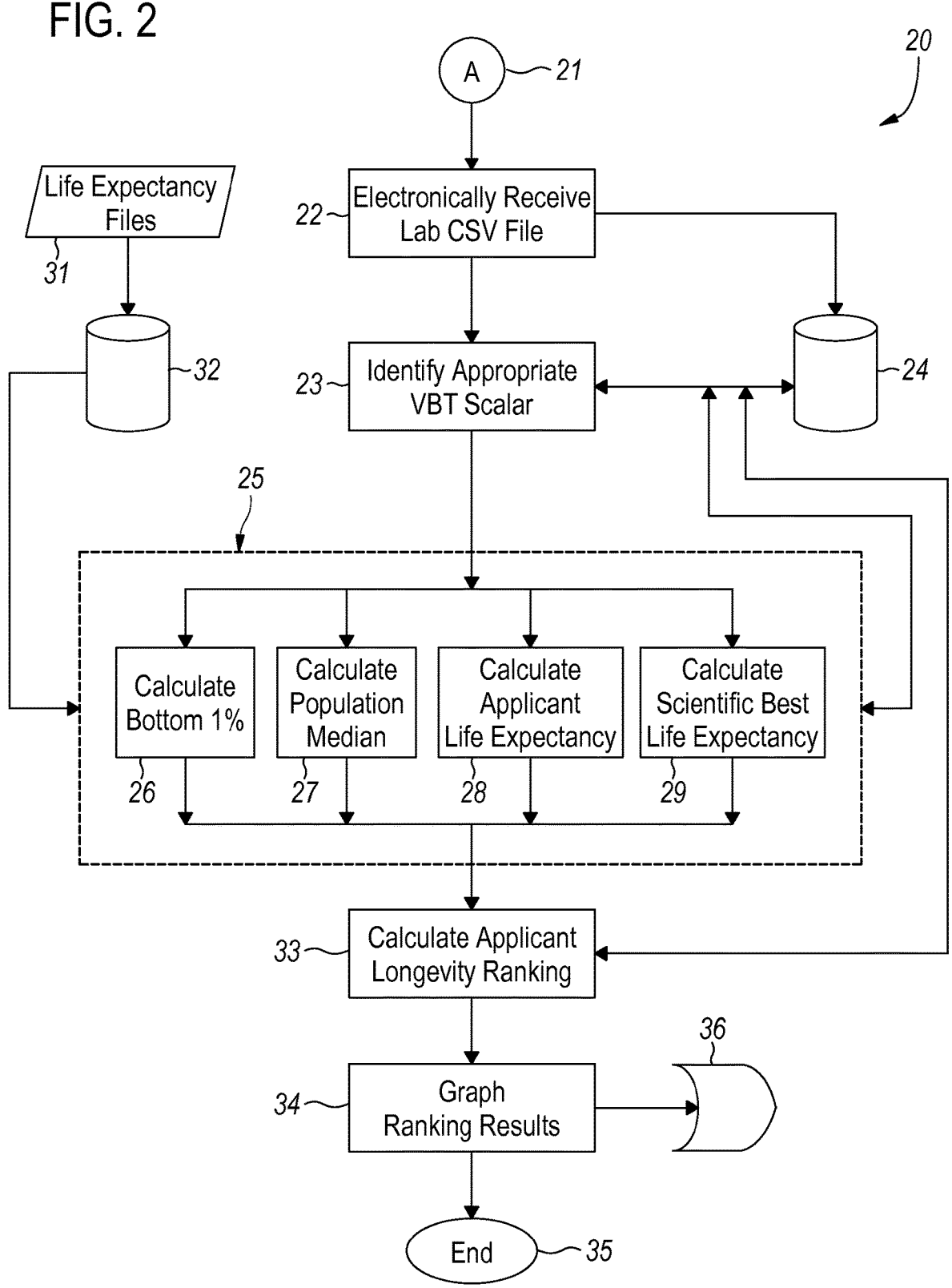
FIG. 2 is a flow diagram of a life expectancy processor system.

Referring to the drawings for a better understanding of the function and structure of the invention, FIG. 1 depicts the front-end steps in data collection and analysis of a potential consumer for life insurance, often referred to as an "applicant," and FIG. 2 depicts a back-end life expectancy processor system. As may be understood, any consumer can utilize the system shown in FIGS. 1 and 2 to comprehend their health position within the community. However, the reality is that currently most consumers undergo a health analysis as part of an insurance application process. For the purposes of the present invention, the term "applicant" may refer to any consumer that utilizes the system and should not be considered restrictive solely to an insurance applicant.

Referring to FIG. 1, a health care practitioner would normally examine the applicant 13 to take physical measurements of the applicant and extract or obtain a fluid sample such as blood or urine. The samples and measurements are then submitted, along with other biographical information of the applicant, to a laboratory 14 for analysis. The blood and urine are analyzed 17 for standard risk factors known in the insurance industry and a risk score is produced representative of the applicant's mortality risk 18. The risk score along with other notable external risk factors are then transmitted 19 in an electronic file, such as for example a comma separated values or "CSV" file, to a life expectancy ranking processor 20 (see FIG. 2).

As shown in FIG. 2, a life expectancy processor 20 uses information transmitted to it by the laboratory to calculate a relative longevity ranking suitable for comprehension by an applicant. After receipt of the CSV file 22, a risk score encoded in the CSV file is retrieved and stored in memory 24. Based upon certain demographic categories and the received CSV risk score, a scalar value is retrieved 23 from a predetermined table that enables the processor 20 to calculate various life expectancies 25 and rank them 33. For example, a bottom 1%, a population median, the applicant, and a scientific best life expectancy 26-29 may be calculated and saved in memory 24. Those life expectancies may then be ranked relative to one another 33 so that the applicant's comparative health position may be shown in a graph 34 and displayed 36. All of the life expectancy calculations in step 25 are dependent upon pre-established life expectancy files 31, such as for example census based actuarial tables, which have been pre-loaded into the processor storage 32, such as a disc drive or random access memory ("RAM"). The implementation of the processor 20 may be accomplished in any standard computing platform utilizing known software programming techniques in which access to memory disk drives and external communications with remote databases is available. Further discussions regarding the particular software or hardware embodiment for the herein disclosed processes are omitted as they are not necessary for a complete understanding of the invention steps and system. To illustrate the operation of the processing steps shown in FIG. 2, an algorithmic example is provided below.

Initially 11, a male, non-smoker age 42 contacts a potential insurance carrier and asks them for assistance in assessing his health via a life expectancy evaluation, sometimes referred to in the industry as a longevity evaluation. The male may or may not be interested in applying for some type of insurance from the carrier, but for the sake of this example he is referred to herein as an "applicant." He may simply be interested in his health relative to others in his community and he knows that this type of information may be assessed via a life expectancy evaluation. The insurance carrier, with or without a fee, then contracts with a health practitioner to visit the applicant to draw blood, take a urine sample, record some biographic information, and take physical measurements (e.g. blood pressure, heart rate, etc.). That information is then entered into a computer via known methods and the samples sent to a lab along with the other collected information.

As is known, various labs may perform health analyses on applicants to assess their state of health. For example, Quest Diagnostics runs a division known as ExamOne that performs such exams for insurance carriers. These types of labs will provide in response to submitted samples and information a health risk analysis and provide a "risk score" for an applicant. ExamOne calls their risk score service "Risk IQ," but other third party labs may provide a similar risk assessment value. Essentially, insurance companies who utilize lab services such as ExamOne are attempting to quantify the health state and potential mortality risk associated with any insurance applicant.

Figure 3:
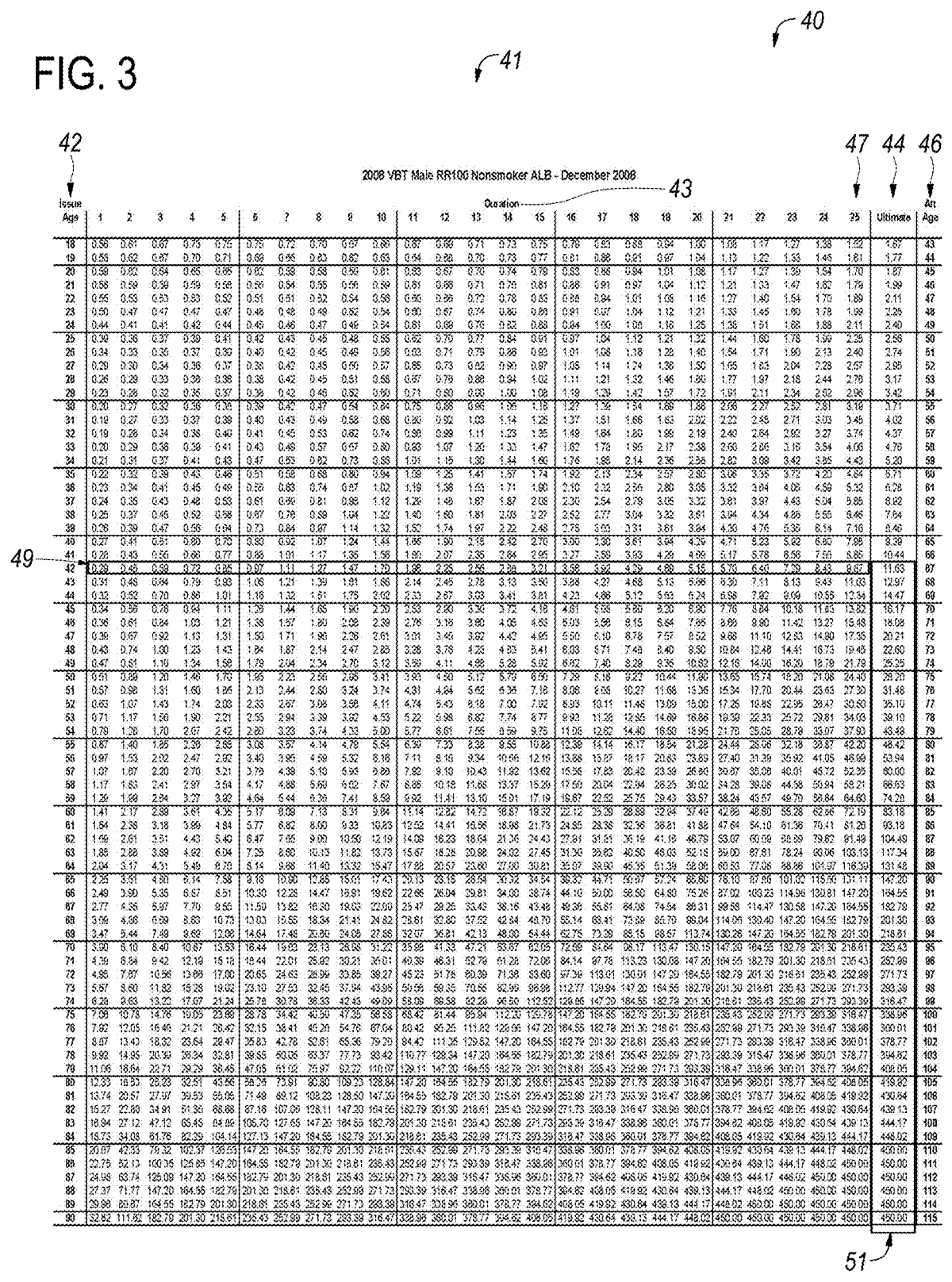

As is known in the industry, all longevity calculations for an insurance applicant are based on mortality tables, sometimes referred to as "a period life tables" and are based upon the mortality experience of a population during a relatively short period of time. There are various types of mortality tables, but most life insurance carriers use a Valuation Basic mortality Table or "VBT" table which shows the statistical chances of a particular individual dying known as a "$q_x$," based on certain parameters. FIG. 3 shows the Society of Actuaries' most recent VBT table 40 created on December 2008 for a male nonsmoker (41). The age of the applicant (e.g. at the time of a policy issuance) is shown on the left axis 42, ranging in this table from age 18 to 90 and the potential duration 43 of the applicant life is shown on the top from age 1 to 25 (47). So, for example, an applicant age 42 has statistical chances of dying in year 1 of 0.29 per 1,000 (i.e. $q_x$=0.29) as shown in row 49 at duration age 1. In year 5, the 42 year applicant has a chance of dying of 0.65 per 1,000. At 25 (47) years from age 42 (i.e. age 67), the person has a statistical chance of dying in that year of 9.87 per 1,000. Any chance of dying after duration 25 is the same for any attained age applicant and is calculated by moving down column 44 based upon the listed attained age 46. So, for an applicant of age 42 all chances of dying in a given year after duration 25 are shown in box 51 which is a portion of column 44 extending downward from row 49.

It is important to note that various types of mortality tables may be utilized in the herein described invention without affecting an understanding of the full operation of the invention. For example, the Society of Actuaries publishes a mortality table, the IRS publishes a mortality table, and the Social Security Administration has tables. Further, such tables are issued periodically, and may be sorted and processed to present mortalities based upon factors such as age, gender, smoking status, etc. In addition, the availability of reliable mortality data is increasing and the inventors anticipate that further filtering of mortality data, such as geographic restrictions within a state, county, city, or local precinct shall be available. Since the publication of mortality tables, their data arrangement, and the basis for their values is well understood in the industry, further explanation regarding their formatting and validity shall be omitted since such information is not necessary for a complete understanding of the herein described invention.

Figure 4:
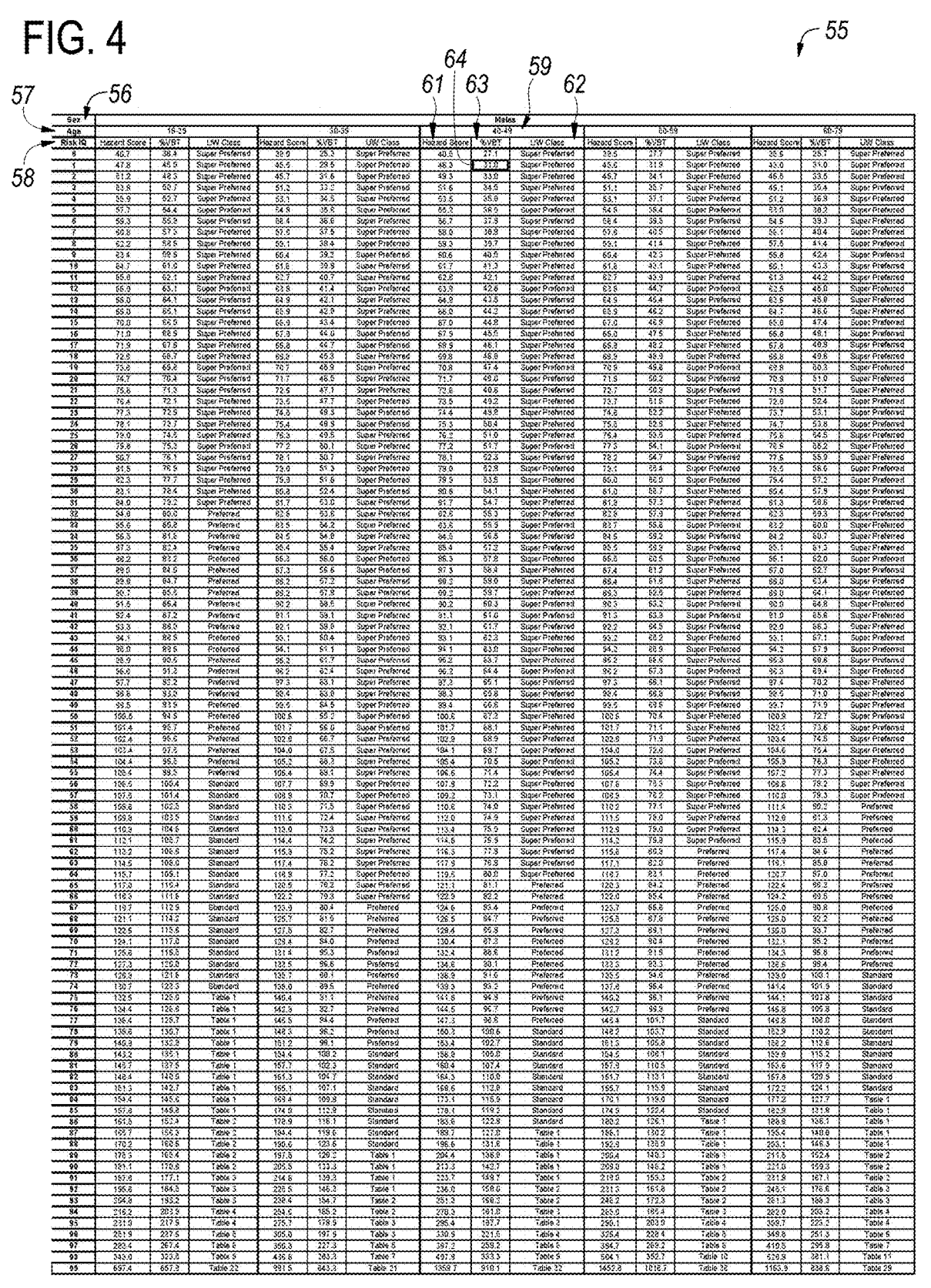

Referring now to FIG. 4, a table 55 is shown with risk scores listed on the left most column 58 with applicant sex 56, age 57 applicable by fields for table 55 identified along rows as shown. For example, a male age 40-49 (59) has three columns of a hazard score 61, a "scalar" or percentage of the VBT $q_x$ value 63, and an underwriting class 62. So, for example a male age 42 having a risk score of 1 would be associated with a scalar of 31.0 (64). In other words, the example male $q_x$'s shown in table 41 of FIG. 3 would be multiplied by a scalar of 31.0 based on the risk score provided by the lab since, based on this example, the male applicant has an excellent health rating from his lab results. The scalar provides a manner in which a pre-selected VBT table may be used to quantify a mortality risk of an applicant based upon examination lab results. The table 55 is pre-configured and stored in memory 32 and utilized in all life expectancy calculations as will be explained.

Table 55 is created as cooperative strategy between the lab and a potential insurer in order to quantify and control risk of their insurance products. However, most carriers simply utilize a broad class range 62 to ascertain an applicant's risk over broad categories of applicants to present suitable insurance premiums. Conversely, a variable scalar value based upon singular risk scores provides a high degree of granularity in risk assessment and is heretofore unknown to the consuming public. The herein described processor 20 is dependent upon a relatively high level of granularity of scalar values held in memory 32 in order to provide a meaningful relative health assessment for the applicant.

The range of risk scores shown in table 55 may vary, but the inventors have selected a range of 0 to 99 as a preferable level of refinement. The scalar values are created through a series of steps based upon life insurance actuarial science. Initially, a base mortality table is selected, such as the 2008 Valuation Basic Table Relative Risk 100 table, with an age last birthday configuration, which is part of the most recent benchmark tables published by the Society of Actuaries. An updated version of this table is scheduled to be published in 2015 which would be utilized at that time. Next, a decision is made as to what mortality splits and sub-splits of the selected base mortality table will be made recognizing that two individuals who are the same age may have widely varying biomedical profiles. By analyzing population and demographic risk trends, such splits are made based upon gender and smoking status. These splits are then subdivided into more industry-adopted health categories of super preferred nonsmoker, preferred nonsmoker or smoker, standard nonsmoker or smoker, and higher risk categories for non-smokers and smokers commonly referred to in the industry as "Tables" (whereby relative higher risks are given higher Table designations). Consideration is also given to the relative proportion of each. The lab then maps the determined table splits to the appropriate demographic (e.g. gender, age group, and smoking category), based upon the data analytics inherent in their risk scoring system. This mapping produces a scalar adjustment to the standard mortality $q_x$ for the calculated risk assessment of the applicant. The inventors then use these adjusted $q_x$'s for life expectancy calculations. This multi-step approach creates 100 gradations of mortality risk for each gender, age group, and smoking category.

Figure 5:
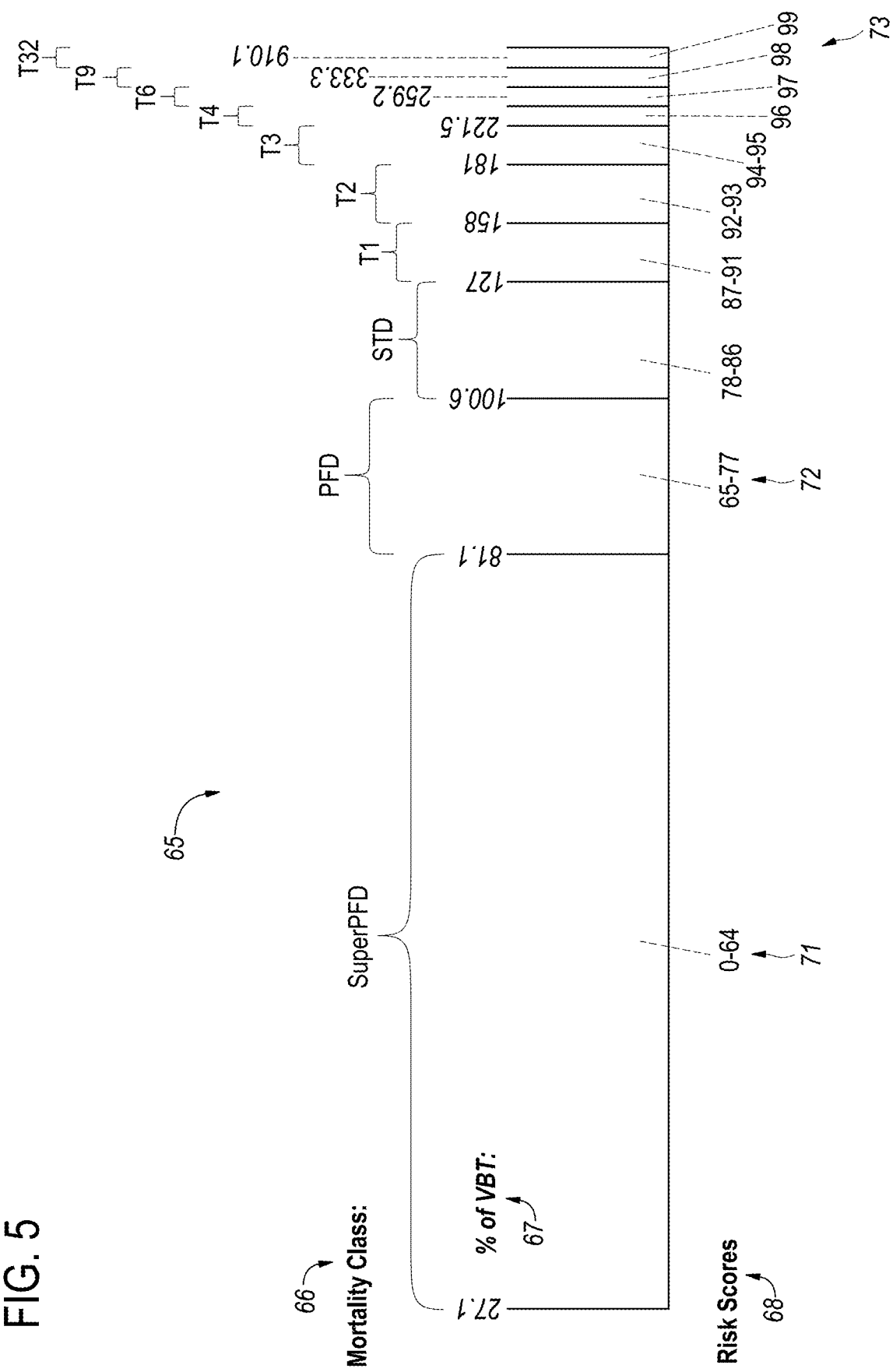
FIG. 5 is a linear graph showing mortality class divisions by mortality risk score and scalar values.

FIG. 5 shows a graphical representation of table 55 in FIG. 4 to better show the improvement over prior applicant mortality classifications. Graph 65 lists standard mortality classes used by life insurance companies 66 such as super preferred, preferred, standard, and higher risk categories T1 through T32. Scalar values based as a percent of VBT (67) vary between 27.1 and 910.1. Risk scores 68 vary along the bottom between 0 and 99. So, for example, a risk score of 65 would reference a scalar of 81.1 as shown, and would be within a preferred mortality class 65-77 (72). The super preferred class would constitute a risk score of 0 to 64 (71) and a scalar of between 27.1 and 80.0. The preferred class would constitute a risk score of 65 to 77 and a scalar of between 81.1 and 98.6, etc. As may be understood, higher risk scores groups 73 representing higher risk health states have higher scalars increasing in values from left to right.

Referring again to FIG. 2 and the applicant example of a male, nonsmoker age 42 having a risk score of 1 (i.e. lower health risks), a life expectancy of the applicant may be calculated 28 by multiplying the scalar rate of 31.0 (64) times the $q_x$'s shown in table 41 and applying a standard life expectancy algorithm to the data held by table 40. While complex, the calculations associated with obtaining a life expectancy based on the data in table 40 for a particular age, $q_x$ values, and scalars are well understood and not necessary for a complete understanding of the present system. However, succinctly stated, a life expectancy is the point at which the cumulative probabilities of death reach 50%, where each successive, distinct probability in a given duration (i.e. $q_x/1,000$) is added to the running total of all the previous distinct probabilities. A more detailed explanation may be found at http://mathworld.wolfram.com/LifeExpectancy.html, hereby incorporated by reference. For the present example and using standard methods, the life expectancy for the applicant using the scalar 31.0 is 93.86, which represents a risk adjusted life expectancy. A scientific best life expectancy 29 is calculated by assuming a risk score of 0 and incorporating the scalar of 27.1 (listed just above 31.0 in table 55) into the life expectancy calculation done above for the applicant risk score of 1 to yield a life expectancy of 95.33. And, for a bottom 1%, a life expectancy 26 may be calculated by utilizing a risk score of 99 and a scalar of 910.1 to yield a life expectancy of 64.66. Hence, utilizing a relative risk score methodology as described, relative life expectancies based on scalar normalized values may be determined. These values are, hence, normalized from the perspective of a range of risk scores extending from 0 to 99 which corresponds to the life expectancy range in table 40. For the population median life expectancy 27, a median remaining life expectancy of $e_x$ of males is obtained from a standard industry source, such as the United States Life Tables, 2010 as found in National Vital Statistics Reports, published by the National Center for Health Statistics (a Division of the CDC), which may be stored electronically in memory 32 and accessed for any applicant age when needed. In the present example for ages 42-43 that remaining life value would be 36.4, which is then added to the present age of the applicant 42 which yields a median life expectancy of 78.4.

Figure 6:
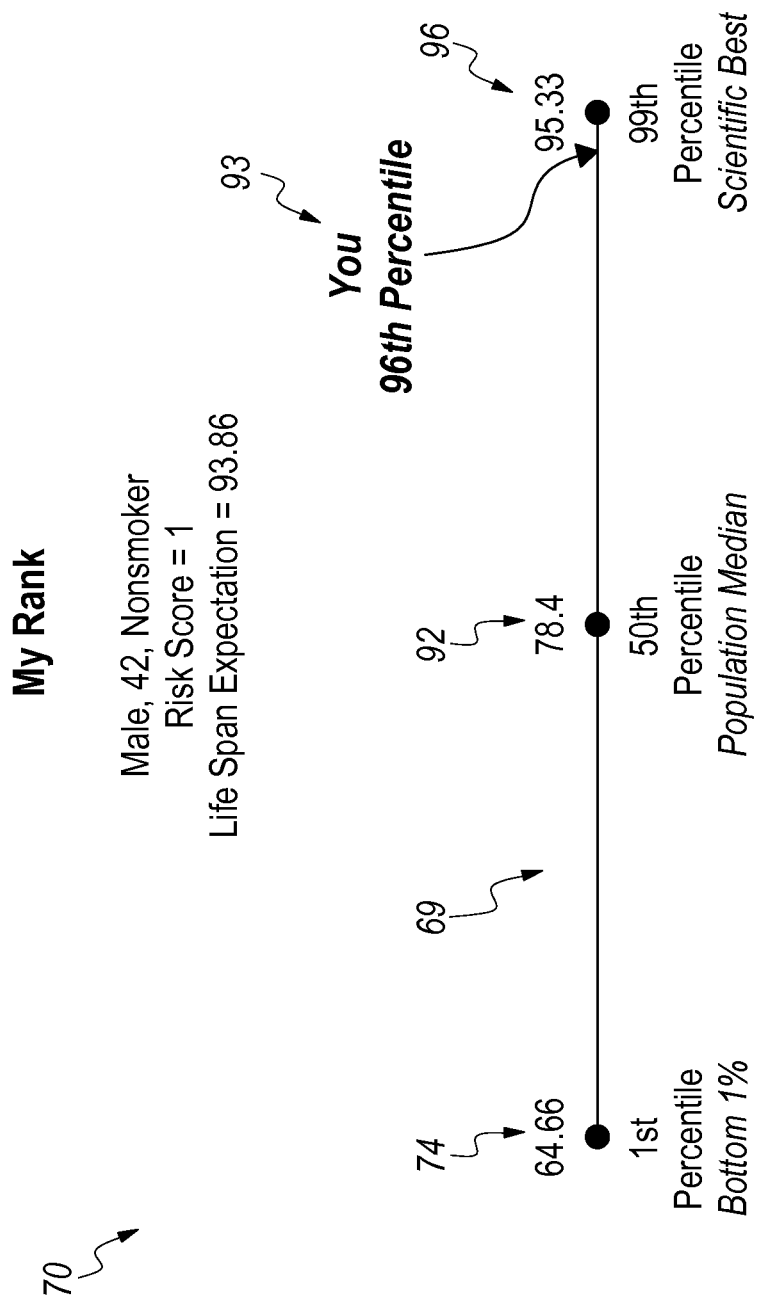
FIG. 6 is a relative life expectancy webpage graph showing percentile ranking of the applicant on a linear scale.

A linear ranking graph showing the above example may be seen in FIG. 6 accessible by an applicant over the internet through known confidential access means. Linear graph 70 includes from left to right on the axis 69 a bottom 1% ranking 64.66 (74), a $50^{th}$ percentile ranking 78.4 (92) representing a population median, the applicant score ranking of $96^{th}$ percentile (93) of 93.86 (shown at top of graph), and a scientific best value $99^{th}$ percentile 95.33 (96). As may be understood, the applicant having received a low risk score of 1 is located on the right most portion of the axis 69 close to the risk score 0 on axis 69 representing the scientific best ranking at the right most point of axis 69.

In order to show relevant percentile rankings and, further, in order to convey meaningful ranking information of the applicant within their community, a modified normalization procedure is applied to the values calculated in step 25 by processor 20. A percentile ranking is established in which the bottom 1% value is assigned a percentile ranking value of 1 and the scientific best value is assigned a $99^{th}$ percentile ranking. The $50^{th}$ percentile ranking is then set at the population median value. The graph is then normalized by assigning increment values along axis 69 between points 74 and 92 such that point 92 is equidistant from point 96 and point 74. Hence, the increment values between points 74 to 92, and 92 to 96 will be different in order to normalize the entire distance on the graph 70 along axis 69.

So, for example, in FIG. 6 the relative position of point 93 of the applicant is determined to be to the right of point 92. The increment for ranking percentages between point 74 and point 92 is calculated to be 0.27480 and the increment for ranking percentages between point 92 and point 96 is calculated to be 0.33860. This is determined by simply calculating the point spread between 78.4 (92) and 64.66 (74) by subtraction (i.e. 78.4-64.66=13.74) to determine the range and dividing by 50. Similarly, the value at point 92, 78.4 is subtracted from 95.33 to yield 16.93 which is divided by 50 to find an increment value of 0.33860. A table is then created calculating the ranking position of the applicant value of 95.65 which equates to a percentile ranking of 96 (rounded to closest percent). This ranking procedure allows for the clear representation of the relative portions of the male applicant's health relative to their community population based upon estimated lifespan longevities.

Figure 7:
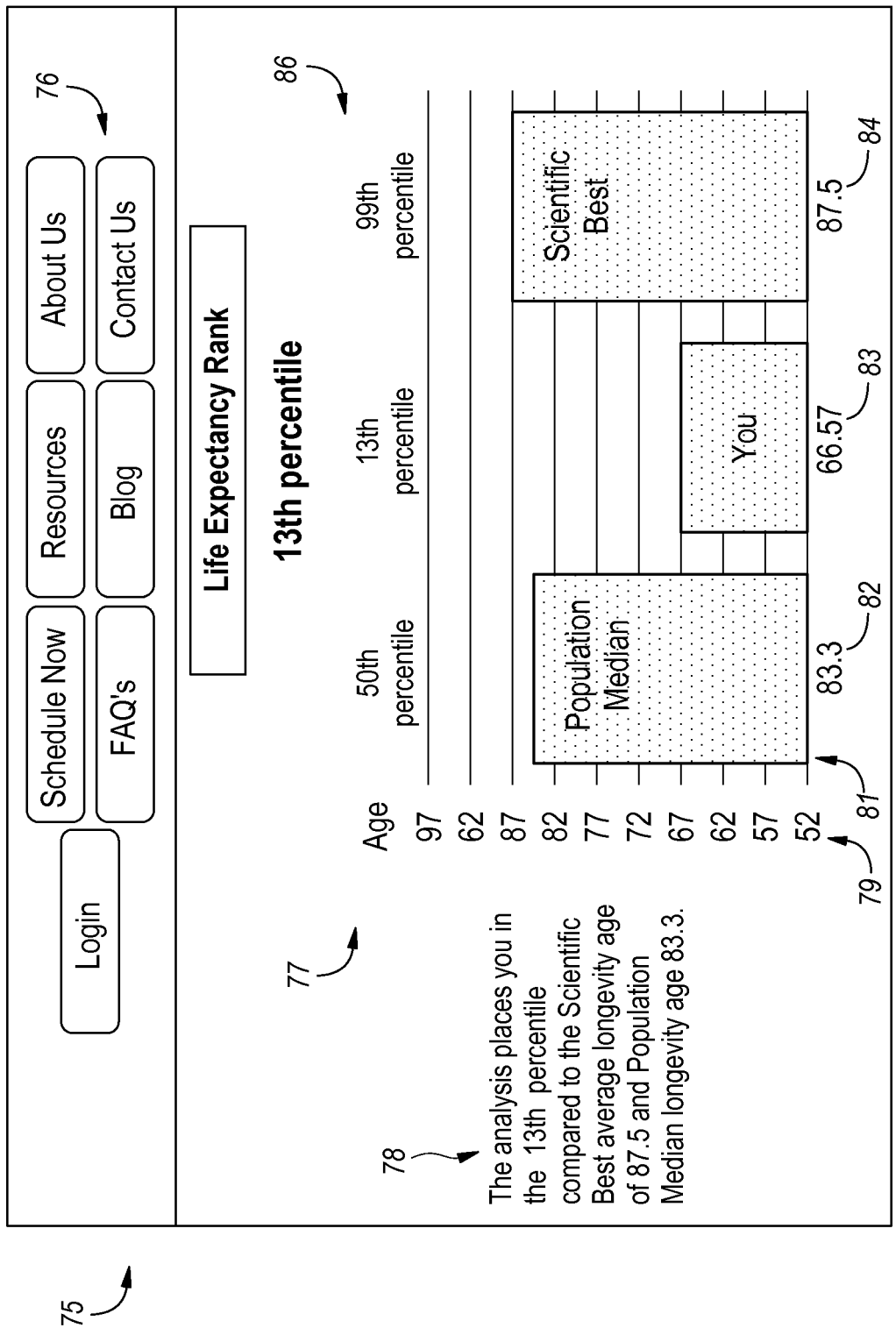
FIG. 7 is a relative life expectancy webpage graph showing percentile ranking of the applicant on a bar graph scale; and, FIG. 8 is an interactive webpage showing the odds of surviving to an applicant selected age in a table format.

Referring now to FIG. 7, a different case may be seen showing a bar ranking graph for an applicant receiving a different risk score from the lab. This type of bar graph presentation provides another manner in which to provide an applicant a sense of where they stand relative to others in their community. Typically, a webpage 75 would be utilized for an applicant to confidentially access their ranking scores over the internet with a special access code. Standard menu buttons appear in the top pane 76 of the webpage and a life expectancy ranking bar graph 77 may be presented with a textual description of the applicant's rank 78. The graph 77 has an age axis 79 and relative bar graphs 81 displayed at different relative percentile values 86. Bar graphs representing the population life expectancy median at 83.3 years (82), the applicant life expectancy of 66.57 years at a 50% chance of attainment (83), and the scientific best bar of 87.5 years of age (84) may be displayed so that the applicant gets a sense of his relative position within the population. The ranking method is accomplished as indicated above, and the upper age limit on the y axis is simply scaled upwards as necessary to accommodate the scientific best bar (84) upper extent.

Figure 8:
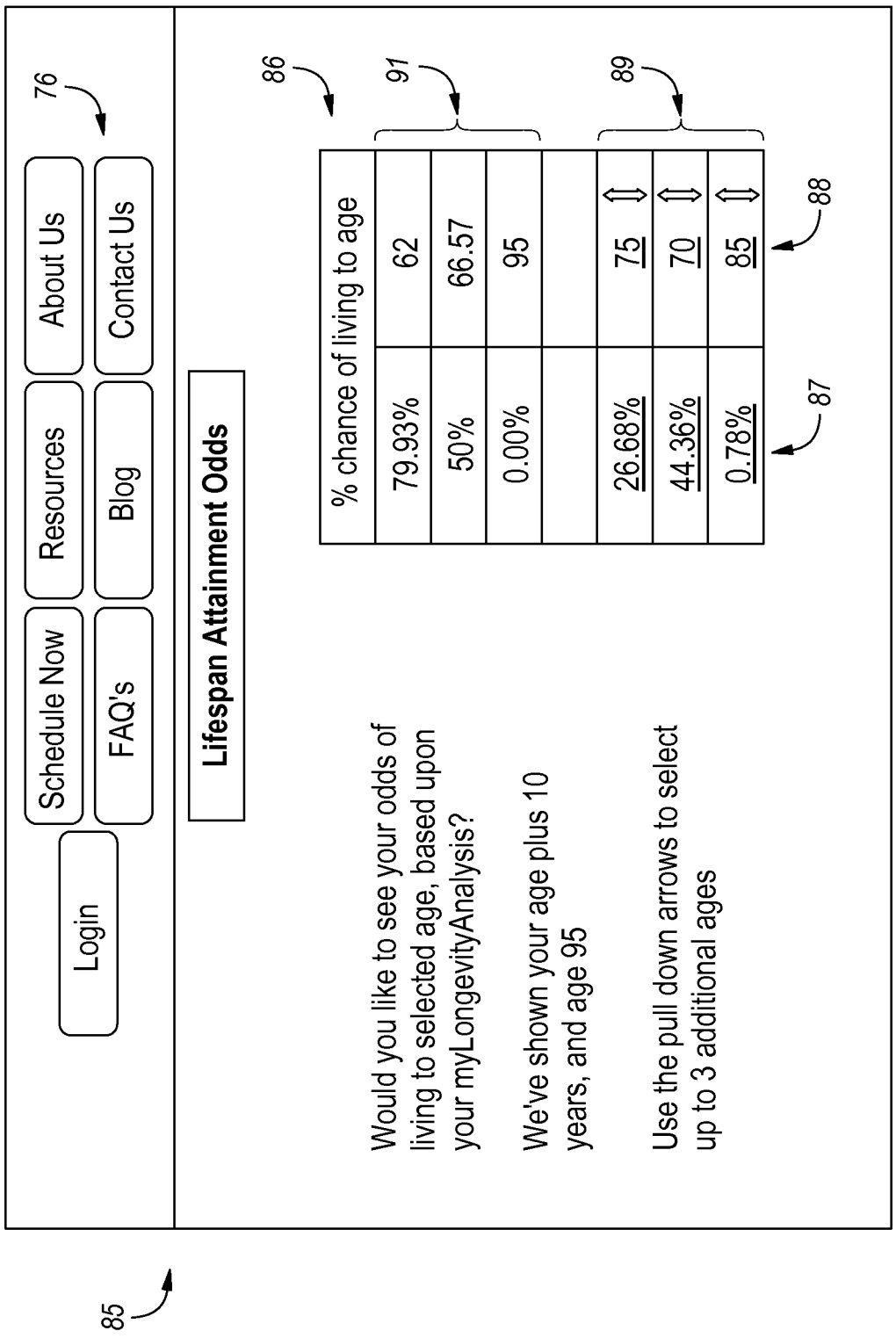

FIG. 8 displays yet another format for displaying relative rankings for an applicant as to their health where an interactive website interface is utilized to promote exploration of an applicant's relative health. Based upon the same processor steps shown in FIG. 2, as well as the ranking procedure described above for FIG. 6, an interactive webpage 85 is shown having a nominal menu interface 76 as in FIG. 7 and an interactive window pane 86 having various selection options to show the probabilities for the applicant to reach a selected age. Option fields 91 are pre-populated to show the longevity of a female age 52, non-smoker with 3 pre-selected attainment ages. The applicant age plus 10 years, or age 62, yields a 79.93% chance of attaining that age. Conversely, a life expectancy value of 50% corresponds with an age of 66.57 years which is likewise displayed to the applicant. And, statistically, the applicant has no chance of attaining age 95 which has been pre-selected by the inventors. The fields of portion 91 are not alterable, because the inventors have determined that these ages and attainment odds are the most valuable set of values for an applicant to effectively gauge their health position in the community population represented within table 41.

Alternatively, fields 89 have selectable values. Three fields 88 allow for selection of up to three ages, each resulting in the population of fields 87 of the chance of attaining the stated age as shown. While the indicated values of 70, 75, and 85, are utilized for demonstration purposes and would be pre-calculated and saved in memory for the webpage 85, the inventors anticipate that any age may be selectable in the fields 88 with processor 20 providing calculated responses on the fly.

While I have shown my invention in one form, it will be obvious to those skilled in the art that it is not so limited but is susceptible of various changes and modifications without departing from the spirit thereof. For example, in each of the examples above and in lieu of the specific VBT table shown other standardized mortality tables may be utilized, each of which would be interchangeable in the system 20 at 31. Further, the inventors anticipate that an applicant/consumer would establish a routine of periodic testing pursuant to the herein disclosed system that would allow for the creation of a favorable health sustainability record. If favorable, the inventors anticipate that such health testing history might be utilized for the offering of reduced premiums by insurance companies.

Having set forth the nature of the invention, what is claimed is:

1. A method for communicating life expectancy to an applicant, comprising the steps of:
   a. examining an applicant to take blood and urine samples, and physical health measurements;
   b. sending said blood and urine samples, and said physical health measurements to a lab;
   c. receiving an electronic data file from said lab encoding a life expectancy risk score and applicant biographical information;
   d. retrieving a scalar data file holding demographically dependent scalar information correlated by life expectancy risk scores from a predetermined electronic table;
   e. accessing a data file holding population lifespan mortality information;
   f. based upon said received risk score, said received biographical applicant information, said population lifespan mortality data file, and said scalar data file, using a computer processor to calculate a lifespan value for said applicant by multiplying a retrieved life expectancy scalar value held by said scalar data file with each mortality value associated with all future ages of said applicant in a pre-established population lifespan mortality table to yield a scaled mortality value, and calculating said applicant lifespan value using said scaled mortality values and saving said applicant lifespan value in a computer storage system; and g. using a computer processor, comparing said calculated lifespan value of said applicant to other selected population life expectancies based upon said population lifespan mortality table and presenting a graphical representation comparison to said applicant over the internet in an interactive website displaying longevity values related to applicant's calculated lifespan value as compared to others in their community.

2. The method as recited in claim 1, further including the step of calculating life expectancies selected from the group consisting of bottom 1%, population median, and scientific best life expectancies.

3. The method as recited in claim 2, wherein said step of comparing said calculated lifespan value of said applicant to other selected population life expectancies comprises the steps of;
   a. established a percentile ranking scale from 0 to 99 wherein 0 and 99 define endpoints of said scale;
   b. plotting percentile 0 position to a lifespan value associated with the bottom 1% life expectancy of said selected population life expectancies;
   c. plotting percentile 99 position to a lifespan value associated with the scientific best life expectancy of said selected population life expectancies;
   d. plotting a 50 percentile position on said scale with a lifespan value associated with a median lifespan life expectancy value of said selected population life expectancies; and
   e. determining the position of said applicant lifespan value on said scale relative to said other pre-established percentile positions and establishing a percentile position of said applicant lifespan value relative to said scale.

4. The method as recited in claim 3, wherein said step of accessing a data file having scalar information includes providing a range of 100 scalar variables mapped to 100 risk scores.

5. A method for assessing the relative health of an applicant in a community, comprising the steps of:
   a. causing an examination of an applicant in which at least blood and urine samples are taken and a physical health measurement is taken;
   b. causing the sending of said at least blood and urine samples and said physic al health measurement to a lab;
   c. receiving an electronic file having a risk score encoded therein over an electronic network from said lab representative of a mortality risk for said applicant and saving said risk score in a computer storage system;
   d. using a computer processor to retrieve a life expectancy scalar value from a predetermined electronic table responsive to said step of receiving said risk score encoded in an electronic file;
   e. in a computer processor calculating an applicant lifespan value by multiplying said retrieved life expectancy scalar value with each mortality value associated with all future ages of said applicant in a pre-established population lifespan mortality table and calculating said applicant lifespan value using said scaled mortality values;
   f. using a computer processor calculating a longevity ranking for said applicant by comparing said calculated applicant lifespan value with a population lifespan mortality table stored in computer memory;
   g. in a computer processor calculating other community longevity rankings based upon said population lifespan mortality table stored in computer memory; and
   h. using a computer processor to create at least one graphical comparison of said applicant longevity ranking to said other community rankings and presenting said graphical comparison in an interactive website displaying longevity values related to applicant's calculated lifespan value as compared to others in their community to said applicant over the internet.

6. The method as recited in claim 5, wherein said step of calculating an applicant longevity ranking comprises the steps of;
   a. established a percentile ranking scale from 0 to 99 wherein 0 and 99 define endpoints of said scale;
   b. plotting percentile 0 position to a lifespan value associated with the bottom 1% of a pre-established population;
   c. plotting percentile 99 position to lifespan value associated with the scientific best lifespan of a pre-established population;
   d. plotting a 50 percentile position on said scale with a lifespan value associated with median lifespan value of said pre-established population; and
   e. determining the position of said applicant lifespan value on said scale relative to said other pre-established percentile positions and establishing a percentile value of said applicant lifespan value relative to said scale.

7. The method as recited in claim 6, wherein said step of calculating other community longevity rankings includes life expectancies selected from the group consisting of bottom 1%, a population median, or scientific best life expectancies.

8. The method as recited in claim 7, wherein said graphing step includes presenting graphs selected from the group consisting of bar graphs, linear graphs, pie chart graphs, bell curve graphs, trend graphs, and frequency graphs.

9. The method as recited in claim 7, wherein said step of identifying a life expectancy scalar value includes the step of selecting said scalar value from at least 100 potential scalar values mapped to risk scores of 0 to 99.

10. The method as recited in claim 9, wherein said population lifespan mortality table in selected from the group consisting of a VBT mortality table, an IRS mortality table, and an SSA mortality table.

11. The method as recited in claim 9, wherein said step of creating at least one graph includes selecting said graph from the group consisting of bar graphs, linear graphs, pie chart graphs, bell curve graphs, trend graphs, and frequency graphs.

12. A method for assessing an applicant's health through longevity calculations, comprising:
   a. receiving an electronic file having a life expectancy risk score encoded therein over a network from a lab having health information about said applicant and saving said risk score in a computer memory storage system;
   b. step using a computer processor for retrieving an identifying a lifespan scalar variable from an electronic table responsive to said step of receiving a life expectancy risk score;
   c. step using a computer processor for calculating an applicant lifespan value responsive to receipt of said lifespan scalar variable and accessing a data file holding a pre-established population lifespan mortality table by multiplying said received scalar value with each mortality value associated with all future ages of said applicant in a pre-established population lifespan mortality table and calculating said applicant lifespan value using said scaled mortality values;

d. step using a computer processor for calculating a longevity ranking for said applicant based upon said calculated applicant lifespan value and saving said calculated ranking in a computer memory storage system; and e. step for electronically graphing a comparison of said calculated applicant longevity ranking to other rankings by presenting a graphical comparison in an interactive website displaying longevity ranking values related to applicant's calculated lifespan value as compared to others in their community over the internet.

13. The method as recited in claim 12, further including step for displaying longevity rankings selected from the group consisting of bottom 1%, population median, and scientific best longevity rankings.

14. The method as recited in claim 13, wherein said step for calculating a longevity ranking comprises;

a. step for establishing a percentile ranking scale from 0 to 99 wherein 0 and 99 define endpoints of said scale;

b. step for plotting percentile 0 position to a lifespan value associated with a bottom 1% of the pre-established population;

c. step for plotting percentile 99 position to a lifespan value associated with a scientific best lifespan value;

d. step for plotting a 50 percentile position on said ranking scale with a lifespan value associated with a median lifespan value of said pre-established population lifespan mortality table; and e. step for determining the position of said applicant lifespan on said ranking scale relative to said other pre-established percentile lifespan positions and including step for establishing a percentile position of said applicant lifespan value relative to said established ranking scale of step (a).

15. A method for assessing an applicant's health, comprising:

a. receiving an electronic file having a risk score encoded therein from a lab based upon health information about said applicant;

b. in a computer processor retrieving a lifespan scalar value mapped to said received risk score from an electronic table stored in a computer memory system having risk scores and scalar values correlated to said applicant, wherein said retrieved scalar value represents a quantified risk responsive to said electronically received risk score;

c. in a computer processor calculating an applicant lifespan value based upon said scalar value and age appropriate VBT population lifespan mortality values by multiplying said retrieved life expectancy scalar value with each mortality value associated with all future ages of said applicant in a pre-established population lifespan mortality table and calculating said applicant lifespan value using said scaled lifespan mortality values and storing said calculated applicant lifespan value in a computer memory system;

d. in a computer processor calculating a longevity ranking for said applicant responsive to said calculated applicant lifespan value and storing said calculated longevity ranking in a computer memory system;

e. in a computer processor calculating other longevity rankings from said pre-established population lifespan mortality table and storing said other longevity rankings in a computer memory system; and f. presenting a graphical comparison of longevity rankings to said applicant in an interactive website displaying longevity values related to said applicant's calculated lifespan value as compared to others in their community via the internet.

* * * * *